United States Patent [19]

Cota et al.

[11] 3,963,043

[45] June 15, 1976

[54] PRESSURE SENSING METHOD AND APPARATUS FOR GASES

[75] Inventors: Marlo E. Cota, Scottsdale; Jerry A. Taylor, Tempe, both of Ariz.

[73] Assignee: Motorola, Inc., Chicago, Ill.

[22] Filed: Jan. 2, 1975

[21] Appl. No.: 538,231

[52] U.S. Cl. ............................ 137/487.5; 137/557; 73/195

[51] Int. Cl.² ........................................ F16K 37/00

[58] Field of Search .................. 137/487.5, 488, 12, 137/14, 458, 557, 461, 84, 463; 73/196, 195, 197; 340/213 R; 235/20, 11 ME

[56] References Cited

UNITED STATES PATENTS

| | | | |
|---|---|---|---|
| 3,237,634 | 3/1966 | Colby, Jr. | 137/557 X |
| 3,318,328 | 5/1967 | Schrader | 137/557 |
| 3,389,718 | 6/1968 | Johnson et al. | 137/458 X |
| 3,665,945 | 5/1972 | Ottenstein | 137/14 |
| 3,742,970 | 7/1973 | Gross | 137/557 X |
| 3,776,249 | 12/1973 | Wailes | 137/14 |
| 3,803,025 | 4/1974 | Dailey | 137/14 X |

*Primary Examiner*—Martin P. Schwadron
*Assistant Examiner*—Robert J. Miller
*Attorney, Agent, or Firm*—Henry T. Olsen; Harry M. Weiss

[57] ABSTRACT

Apparatus utilizes two or more orifices in series, fixed normal to the flow field, which provide a pressure reservoir from which the static pressure is sensed for the purpose of sensing variations in flow within a tube. The apparatus comprises a plurality of orifices, flow regulators, pressure repeaters and electrical pressure switches all connected so as to function as a complete system.

4 Claims, 5 Drawing Figures

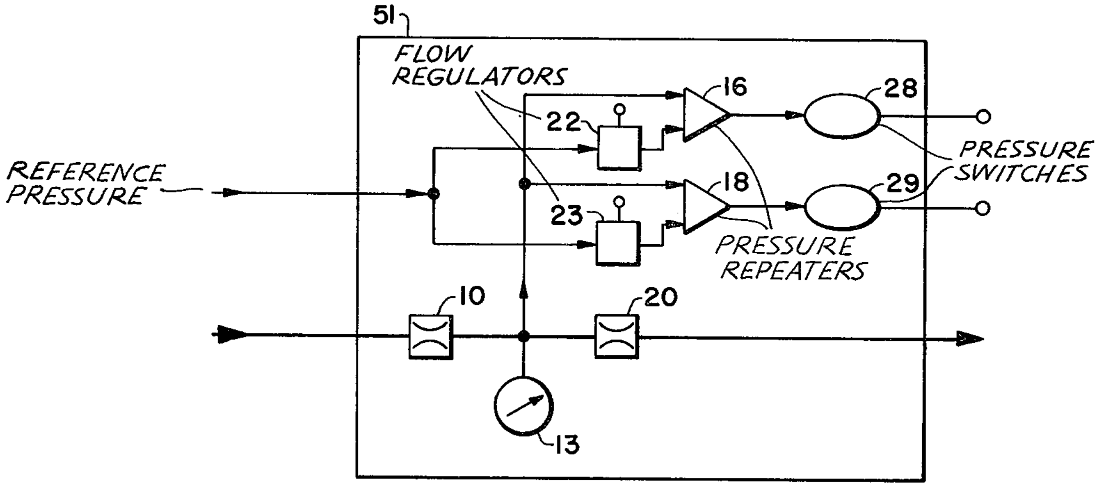
FIG. 2
FIG. 3
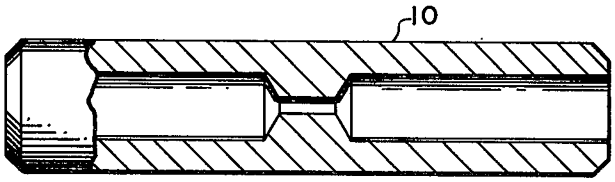
FIG. 4
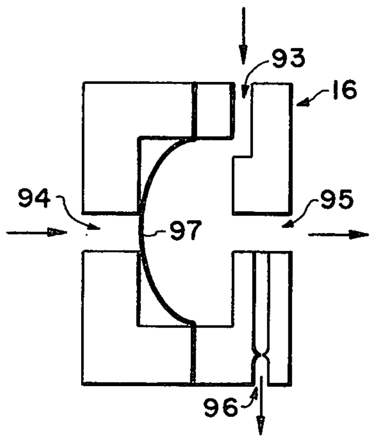
FIG. 5
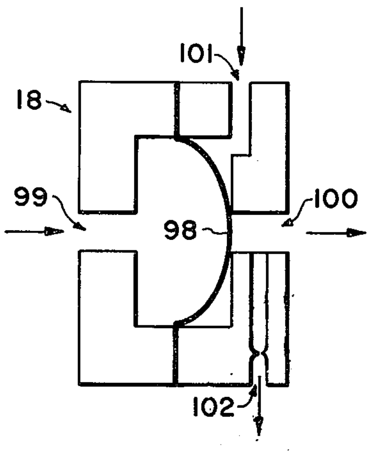

PRESSURE SENSING METHOD AND APPARATUS FOR GASES

BACKGROUND OF THE INVENTION

1. Field of Invention

This invention relates to apparatus for the processing of semiconductor wafers for the transistor and integrated circuit industry and more particularly to apparatus for diffusing PN junctions into semiconductor material and still more particularly to sensing apparatus which monitors the flow of gas to a diffusion furnace.

In the manufacture of semiconductor devices by a single or double diffusion process, a semiconductor wafer is masked in appropriate areas so as to provide windows in the masking. PN junctions are created through these openings by exposing the wafer together with a batch of other wafers to a gaseous atmosphere containing a dopant ion for usually a matter of minutes although some diffusions may require hours.

Semiconductor wafer batch processing within a diffusion furnace requires a very reliable, repeatable and accurate apparatus, simple in design and adaptable to electrical binary signal, for the purpose of monitoring relatively low gas to flow through separate and individual gas supply tubes leading to the diffusion furnace. In general, the control of these gas supplies has been by visual and manual techniques.

Recent emphasis has been placed on the development of methods and apparatus capable of operating on a continuous basis and simultaneously maintaining such aspects as quality control and repeatability of operation for accurately controlling the flowing and mixing of gases to a diffusion furnace. The gas flow within the diffusion furnace produces convection effects which are highly affected by the accurate flow of new gas. Because of the extreme criticality of processing parameters necessary for the processing of silicon wafers within a diffusion furnace, substantial developmental effort has been directed to devise methods and apparatus for accurately and reproducibly monitoring the flow of new gas to the diffusion furnace.

2. Description of Prior Art

Prior art apparatus used for measuring and controlling the flow of gases to a diffusion furnace where semiconductor wafers were being processed consisted of a standard flowmeter or manometer (a graduated glass cylinder) and manual control valve.

Where the accurate mass transfer within a flowing gas was considered critical manufacturing differences from one flow meter and control valve to another rendered an intolerable condition.

Flow meter readings were interpreted differently and different techniques for adjusting gas flow to the diffusion furnace were applied; thus leading to fewer acceptably processed semiconductor wafer batches.

Prior art apparatus prove to be undesirable from the standpoint of individual variations in the apparatus used to sense gas flow and control gas flow.

SUMMARY OF THE INVENTION

The foregoing and other shortcomings and problems of the prior art are overcome, in accordance with the present invention, by a novel gas pressure sampling apparatus which utilizes the gaseous media, whose thermodynamic property of pressure is being measured, both as the measuring means for gas flow and to actuate a membrane valve which in turn initiates an electrical pressure switch indicating the binary state of the pressure sensed, as to exceeding or not exceeding a preset pressure limit.

According to an aspect of the present invention, novel information gathering means whereby a sample of the gas whose pressure is being sensed, provides a pressure range whereby the system sensitivity required is achieved, with exacting repeatability.

According to still another aspect of the present invention, novel method is provided whereby complete isolation of the flowing gas, whose rate of flow is being measured, is maintained from the measuring means; such method involves a balance of a reference gas system static pressure and the monitored gas system static pressure.

In summary the purpose of the instant invention is to devise methods and apparatus which will monitor the supply of gas to a diffusion furnace and at the same time maintain such aspects as reliability, repeatability, accuracy, simplicity of design and conformity to electrical binary signal output.

BRIEF DESCRIPTION OF THE DRAWINGS

The foregoing and other aspects of the present invention will be understood more fully from the following detailed description of an illustrative embodiment of the present invention in conjunction with accompanying drawings, in which:

FIG. 2 shows an illustrative pressure sensing circuit of the present invention in block diagram form;

FIG. 3 shows a cross-sectional view of a circular orifice of the type incorporated in the pressure sensing circuit shown in FIG. 2.

FIGS. 4 and 5 show a cross-sectional view of a pressure repeater of the type incorporated in the pressure sensing circuit shown in FIG. 2.

DESCRIPTION OF THE PREFERRED EMBODIMENTS

Figure 1:
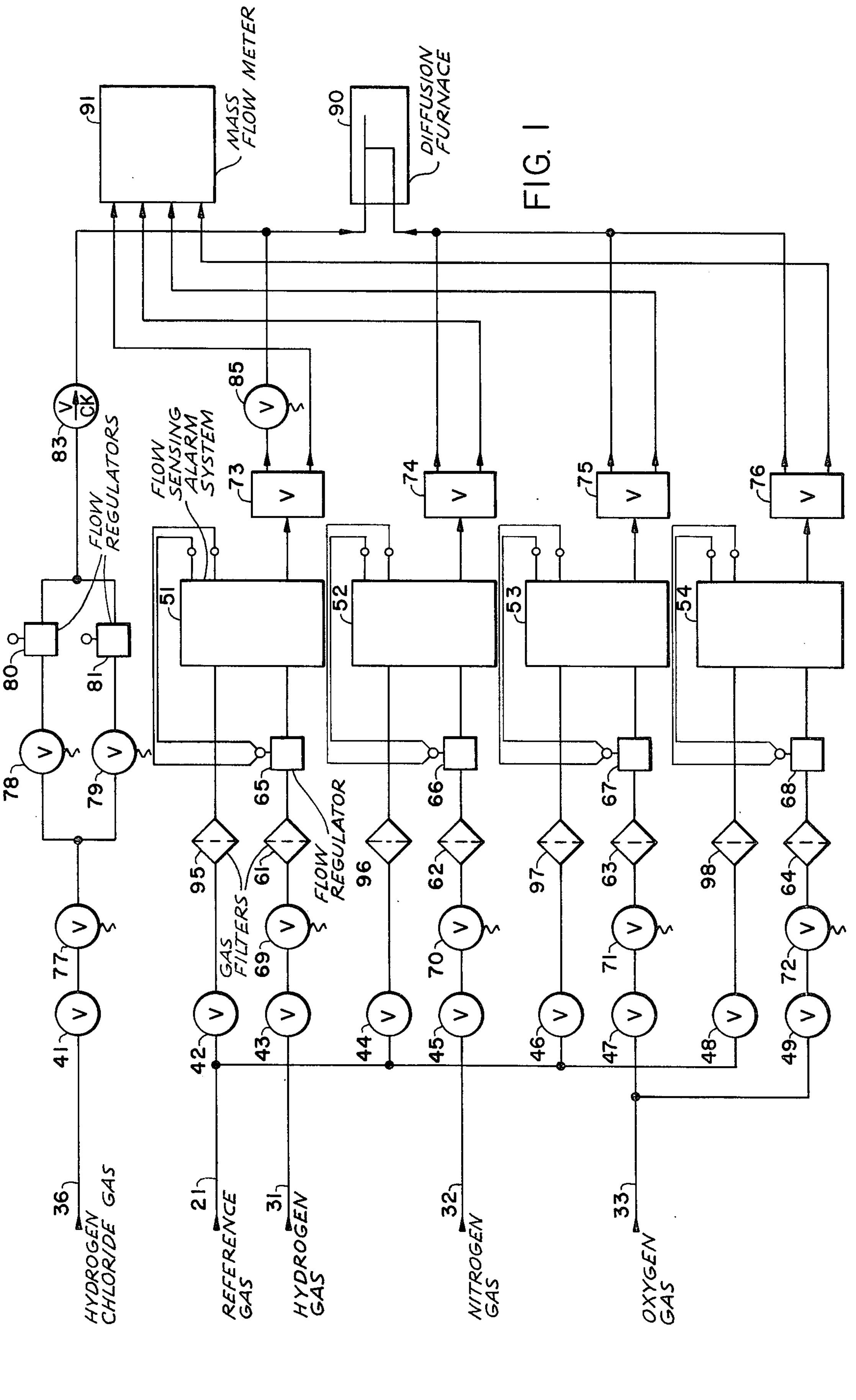
FIG. 1 shows a block diagram of a gas supply system in which the present invention may be utilized.

Referring to FIG. 1 there is shown a gas supply system utilized in conjunction with a diffusion furnace 90 for the processing of silicon wafers, as pertains to the production of semiconductors, that comprises separate and individual gas flow control systems for gas supply tubes 36, 31, 32 and 33.

Supply tube 21 provides a gas supply, hereafter referred to as a "reference gas," which supplies a constantly flowing gas to each flow sensing alarm system 51, 52, 53 and 54.

It is to be understood that the reference gas system is separate and distinct from all other gas supply systems, and has as its sole purpose a reference for mechanical pressure whereby all other gas supply systems are compared for the purpose of gas flow control.

Supply tube 36 provides a Hydrogen Chloride gas flow regulators 80 and 81 through normally closed electrically operated valves 78 and 79, respectively. The purpose of having a plurality of Hydrogen Chloride flow regulators 80 and 81 lies in the fact that two separate process segments are required which demand different constant flow rates. Check valve 83 is utilized to prevent backflow and contamination of the Hydrogen Chloride gas supply. Supply tube 31 provides a Hydrogen gas to flow regulator 65 through normally closed electrically operated valve 69; supply tube 32 provides a Nitrogen gas to flow regulator 66 through normally open electrically operated valve 70; and supply tube 33 provides an Oxygen gas to flow regulators 67 and 68 through normally closed electrically operated valve 71 and normally open electrically operated valve 72, respectively. The purpose of having a plurality of Oxygen gas systems regulated with flow regulators 67 and 68 lies in the fact that two separate process segments are required which demand different constant flow rates.

Note also that an electrically operated valve 85 is provided in the Hydrogen gas supply system in addition to electrically operated valve 69 for the purpose of safety regulations. Both valves 85 and 69 are normally closed valves.

Batch processing of a given lot of silicon wafers would typically consist of eight continuous process segments lasting up to several hours, whereby all gas systems are utilized at different times, both singularly and in a specified mixture. The mixing of all spontaneously combustible gases occur within process tube located within a diffusion furnace.

It is to be understood that "furnace" mentioned in this specification is used as a generic expression to denote any mechanical encasement where the immediate environment therewithin is carefully controlled with respect to the convection of process gases and heat flux.

Each gas supply system shown in FIG. 1 is separately equipped with master manually operated flow control valves such as valves 41–49. Manually operated flow control valve 41 provides a gate for Hydrogen Chloride gas; manually operated flow control valves 42, 44, 46 and 48 each provide a gate for separate pressure alarm system reference gas supplies; manually operated flow control valve 43 provides a gate for Hydrogen gas; manually operated flow control valve 45 provides a gate for Nitrogen gas; and, manually operated flow control valves 47 and 49 each provide a gate for separate Oxygen gas supply systems.

Each gas supply system shown in FIG. 1 is supplied with in-line flow through gas filters as follows: 61 for Hydrogen gas; 62 for Nitrogen gas; 63 and 64 for Oxygen gas; and 95, 96, 97 and 98 for reference gas.

Following the master gas supply control valves for each gas supply system, a gas flow regulator is provided such as Hydrogen gas flow regulator 65, Nitrogen gas flow regulator 66, Oxygen gas flow regulators 67 and 68, and Hydrogen Chloride gas flow regulators 80 and 81 to regulate the supply of gas to the diffusion furnace 90. Calibration of the Hydrogen, Nitrogen and Oxygen gas supply systems is accomplished by utilizing a mass flow meter which is capable of sensing down to a one percent variation in total gas flow. Control valves 73, 74, 75 and 76 are utilized to divert the individual gas supplies Hydrogen, Nitrogen and Oxygen separately to a mass flow meter 91 temporarily for individual gas flow calibration. Hydrogen gas flow regulator 65, Nitrogen gas flow regulator 66, and Oxygen gas flow regulators 67 and 68 are provided for adjusting their individual gas supplies during the calibration process. The Hydrogen Chloride gas supply system utilizes standard flow regulators 80 and 81 for calibration of the required flow of gas.

It should be understood that calibration is used in this Application to denote a set-up procedure which precludes each diffusion furnace process requiring different amounts of gas supply to diffusion furnace 90.

Subsequent to the calibration of gas flow for the gas supply systems Hydrogen, Nitrogen and Oxygen utilizing their respective flow control regulators 65, 66, 67 and 68 as described above, flow sensing alarm systems 51, 52, 53 and 54 are calibrated to sense less than a 1 percent change in the total variation of static line pressure by adjusting flow regulators 22 and 23, FIG. 2. Flow sensing alarm systems 51, 52, 53, and 54 are separately and individually provided for the Hydrogen, Nitrogen and Oxygen gas supply systems and provide a remote signal when gas flow in the respective system is out of tolerance, i.e., out of control deadzone.

Referring to FIG. 2 there is shown in detail flow sensing alarm system 51 as is utilized in the gas supply system for a diffusion furnace, described in FIG. 1. Systems 51, 52, 53 and 54 being identical only one will be described. System 51 comprises two metering orifices 10 and 20, two pressure repeaters 16 and 18, two gas flow regulators, 22 and 23, and two electrical pressure switches 28 and 29. Mechanical pressure gauge 13 provides a coarse measurement of static pressure between orifices 10 and 20. Orifices 10 and 20 are designed so as to provide a pressure reservoir therebetween whereby the static pressure derived therein is transmitted to pressure repeaters 16 and 18 where said static pressure is compared with preset reference pressures, which describe the allowable pressure deadzone.

It is to be understood that a pressure deadzone is a region described by an upper and a lower pressure limit and therefore all pressures within this upper and lower limit serve to indicate a state of acceptable flow conditions in each of the respective Hydrogen, Nitrogen and Oxygen gas supply systems.

Pressure repeaters 16 and 18 serve as mechanical summing junctions whereby precalibrated reference pressures, as determined by flow control regulators 22 and 23, are compared with the static tube pressure of either a Hydrogen, Nitrogen or Oxygen gas supply system, as measured between metering orifices 10 and 20. If gas flow in either the Hydrogen, Nitrogen or Oxygen gas supply systems is within specified limits, as determined by flow control regulators 22 and 23, pressure repeaters 16 and 18 will not activate their respective electrical pressure switch. If gas flow in either the Hydrogen, Nitrogen or Oxygen gas supply systems has exceeded specified pressure limits, indicating excessive gas flow within the supply tube as determined by flow control regulators 22 and 23, pressure repeaters 16 and 18 will activate the corresponding electrical pressure switch indicating a logical state one.

It is obvious that binary signals initiated by pressure switches 28 and 29 can be utilized as source information to in turn initiate the required gas flow control corrections.

Referring to FIG. 3 is shown the gas flow metering orifice specifically designed for a given gas flow system and utilized as shown in FIG. 2 as items 10 and 20 for the purpose of providing a pressure reservoir from which static pressure is measured; the pressure magnitude is determined by the gas flow sensitivity required for the different gas supply systems. Normally metering orifices 10 and 20, FIG. 2 are identical in size and shape; however, the orifice size will vary for different gas supply systems, depending on the pressure buildup required therebetween. Orifices 10 and 20 being identical only one need be described.

Referring to FIG. 4 is shown a cross-sectional view of pressure repeater 16 in the normal state whereby electric pressure switch 28 has an output signal of logical state zero; e.g., when process gas static pressure sensed through port 94 is within acceptable limits, respectively indicating process gas flow rate is within acceptable limits, reference gas static pressure supplied through port 93 and exited through restrictor 96 maintains normally closed electric pressure switch 28 in a state of electrically open, thus indicating a logical state zero. When process gas static pressure sensed through port 94 exceeds the high pressure limit, respectively indicating process gas flow-rate is greater than acceptable limits, flexible membrane 97 is actuated to seal port 95 from reference static gas pressure, as determined by flow-regulator 22 and sensed at port 93, whereby normally closed pressure switch 28 is permitted to revert to a state of electrically closed, thus indicating a logical state one.

Referring to FIG. 5 is shown a cross-sectional view of pressure repeater 18 in the normal state whereby electric pressure switch 29 has an output signal of logical state zero; e.g. when process gas static pressure sensed through port 99 is within acceptable limits, respectively indicating process gas flow rate is within acceptable limits, reference gas static pressure supplied through port 101 and exited through restrictor 102 maintains normally open electric pressure switch 29 in a state of electrically closed, thus indicating a logical state zero. When process gas static pressure sensed through port 99 exceeds the low pressure limit, respectively indicating process gas flow-rate is less than acceptable limits, flexible membrane 98 is actuated to open port 100 to reference static gas pressure, as determined by flow-regulator 23, whereby normally open pressure switch 29 is actuated to a state of electrically closed, thus indicating a logical state one.

Various other modifications and changes may be made to the present invention from the principles of the invention described above without departing from the spirit and scope thereof.

What is claimed is:

1. Apparatus for sensing the rate of flow of a gas through a conduit, said apparatus having individual summing junctions for high and low flow limits, each summing junction having a reference flow source, said apparatus comprising:

at least two orifices installed in series within a conduit, normal to the flow of gas, so as to provide a pressure reservoir therebetween; and a pressure tap mounted in the wall of the conduit to supply a sample of the flowing gas, whose pressure is to be sensed.

at least two pressure repeaters respectively providing separate and individual summing junctions for preset high and low pressure limits whereby these preset high and low pressure limits describe a band of acceptable gas flow rates and these preset high and low pressure limits are some function of respective high and low gas flow rates each including a flexible membrane one side of which is connected to the pressure tap;

a separate and independent reference gas pressure source supplying calibrated static pressure to the other side of each of the flexible membranes mounted within the pressure repeaters; and at least two pressure switches each operating from a separate and individual pressure repeater indicating the binary state of the monitored gas static pressure.

2. The apparatus according to claim 1, and further including a plurality of similar pressure sensing systems which operate from the reference gas system.

3. The apparatus for sensing gas flow as defined in claim 1 and further including:

an actuation means electrically coupled to said pressure sensing apparatus for receipt of electrical signals for the purpose of automatically correcting the gas flow which is being sensed.

4. The apparatus for sensing the flow of a gas through a conduit as defined in claim 1 and further including:

gas supply ports for processing gas sample disposed in each summing junction pressure repeater, gas supply ports for receiving a reference gas supply disposed in each summing junction pressure repeater, gas exit ports for receiving reference gas in each summing junction pressure repeater, and gas venting ports communicating with the reference gas system in each summing junction pressure repeater.

* * * * *